(12) United States Patent
Taguchi et al.

(10) Patent No.: US 11,427,399 B2
(45) Date of Patent: Aug. 30, 2022

(54) AIRCRAFT WATER TANK

(71) Applicant: The Yokohama Rubber Co., LTD., Tokyo (JP)

(72) Inventors: Yuji Taguchi, Hiratsuka (JP); Hiroshi Hagiwara, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 300 days.

(21) Appl. No.: 16/762,486

(22) PCT Filed: Jun. 29, 2018

(86) PCT No.: PCT/JP2018/024964
§ 371 (c)(1),
(2) Date: May 7, 2020

(87) PCT Pub. No.: WO2019/092915
PCT Pub. Date: May 16, 2019

(65) Prior Publication Data
US 2021/0179344 A1 Jun. 17, 2021

(30) Foreign Application Priority Data
Nov. 7, 2017 (JP) .............................. JP2017-214435

(51) Int. Cl.
*B64D 11/00* (2006.01)
*B65D 88/14* (2006.01)
*B65D 90/12* (2006.01)

(52) U.S. Cl.
CPC .......... *B65D 88/14* (2013.01); *B64D 11/0007* (2013.01); *B65D 90/12* (2013.01)

(58) Field of Classification Search
CPC ...... B64D 11/0007; B64D 11/02; B65D 90/12
See application file for complete search history.

(56) References Cited

U.S. PATENT DOCUMENTS

| 1,668,179 | A | * | 5/1928 | Williams | .................. | F17C 1/08 |
| | | | | | | 220/653 |
| 7,100,640 | B2 | * | 9/2006 | Kirma | .................... | B64D 11/02 |
| | | | | | | 220/4.27 |
| 7,537,021 | B2 | * | 5/2009 | Kirma | .................... | B64D 11/02 |
| | | | | | | 137/266 |

(Continued)

FOREIGN PATENT DOCUMENTS

| JP | 2015-083479 | 4/2015 |
| JP | 2015-085946 | 5/2015 |

(Continued)

OTHER PUBLICATIONS

International Search Report for International Application No. PCT/JP2018/024964 dated Aug. 14, 2018, 4 pages, Japan.

*Primary Examiner* — Philip J Bonzell
(74) *Attorney, Agent, or Firm* — Thorpe North & Western (57) ABSTRACT

An aircraft water tank is provided. With an aircraft water tank being suspended by a fuselage via bushes, a load applied to each of the bushes is transferred from the bush and an attachment hole to a metal plate. The load transferred to metal plate is transferred to a total of four prepreg projection portions at a section of a thick wall portion of the metal plate and transferred to a total of eight prepreg projection portions at a section of a thin wall portion.

12 Claims, 10 Drawing Sheets

(56) References Cited

U.S. PATENT DOCUMENTS

| | | | |
|---|---|---|---|
| 7,681,585 B2* | 3/2010 | Kirma | B64D 11/02 137/266 |
| 10,040,624 B2* | 8/2018 | Masuda | B65D 25/14 |
| 2004/0074547 A1* | 4/2004 | Kirma | B64D 11/02 137/899.2 |
| 2006/0254658 A1* | 11/2006 | Kirma | B64D 11/02 137/899.2 |
| 2009/0199920 A1* | 8/2009 | Kirma | B64D 11/02 137/899.2 |
| 2011/0064908 A1 | 3/2011 | Kweder | |
| 2012/0308766 A1 | 12/2012 | Kweder | |
| 2013/0292387 A1* | 11/2013 | Spencer | B60P 3/2245 220/562 |
| 2016/0257403 A1* | 9/2016 | Masuda | B29D 22/003 |
| 2016/0272413 A1* | 9/2016 | Masuda | B65D 1/16 |
| 2018/0222669 A1* | 8/2018 | Taguchi | B65D 88/54 |
| 2020/0369464 A1* | 11/2020 | Kato | B29C 70/72 |

FOREIGN PATENT DOCUMENTS

| | | |
|---|---|---|
| JP | 3198893 | 7/2015 |
| JP | 2016-156394 | 9/2016 |
| WO | WO 2011/034684 | 3/2011 |
| WO | WO 2015/060309 | 4/2015 |
| WO | WO 2015/064424 | 5/2015 |

* cited by examiner

AIRCRAFT WATER TANK

TECHNICAL FIELD

The present technology relates to an aircraft water tank.

BACKGROUND ART

Aircrafts are provided with an aircraft water tank in which drinking water is stored.

Many aircraft water tanks include a cylindrical body portion and dome portions provided on opposite ends of the body portion.

For installation of a tank body in the fuselage of the aircraft, a tank installation attachment portion is provided at an outer circumferential portion of the body portion.

The tank installation attachment portion includes a base portion, a flange, and an attachment plate portion.

The base portion includes a plurality of band-like prepregs layered on an outer circumferential surface of the body portion.

The flange includes a plurality of prepregs layered in a direction parallel to the axial direction of the body portion, and projects outward from the base portion in the radial direction of the body portion, while extending in the extension direction of the base portion.

The attachment plate portion includes a prepreg projection portion including the plurality of prepregs of the flange projecting outward from the flange in the radial direction of the base portion, while extending along the extension direction of the base portion, a metal plate housed and disposed in a housing space formed by cutting away an internal portion of the prepreg projection portion, and an attachment hole formed to extend through the prepreg projection portion and the metal plate in a direction parallel to the axial direction of the body portion.

The aircraft water tank is installed on the fuselage via a bolt or the like inserted through the attachment hole in the attachment plate portion.

On the other hand, in a case where the aircraft water tank is supported by being suspended by the fuselage from above and has an increased tank capacity, a force that acts on the attachment plate portion via the through-hole is increased.

Thus, the thickness of the metal plate may be increased.

However, various dimensions of the aircraft water tank are constrained, and the thickness of the attachment plate portion is also constrained.

Accordingly, an increased thickness of the metal plate reduces the number of prepregs located on both sides of the metal plate in the thickness direction to sandwich the metal plate between the prepregs, and the prepregs fail to withstand loads from the metal plate and are damaged.

SUMMARY

The present technology provides an aircraft water tank that allows for an increase in the thickness of the metal plate while suppressing an increase in the thickness of the attachment plate portion, and that prevents the attachment plate portion from being damaged.

An embodiment of the present technology is an aircraft water tank including a tank installation attachment portion provided on a cylindrical body portion of a tank body, the tank installation attachment portion including a base portion that includes a plurality of prepregs being band-like and layered on an outer circumferential surface of the body portion in a radial direction of the body portion, and that extends in a circumferential direction of the outer circumferential surface, a flange that is formed by folding, from the base portion and outward of the body portion in the radial direction, the plurality of prepregs layered and that extends along an extension direction of the base portion, and an attachment plate portion provided on at least one section in an extension direction of the flange, the attachment plate portion including an attachment plate portion prepreg that includes the plurality of prepregs projecting outward from the flange in the radial direction of the body portion while extending along the extension direction of the base portion, a metal plate housed in a housing space inside the attachment plate portion prepreg, and an attachment hole formed to extend through the attachment plate portion prepreg and the metal plate in a direction parallel to an axial direction of the body portion, the metal plate having a length along a circumferential direction of the body portion and a thickness along the direction parallel to the axial direction of the body portion, the attachment hole being formed in an intermediate portion of the metal plate in a longitudinal direction, a thickness of the intermediate portion of the metal plate in the longitudinal direction having a dimension larger than a dimension of a thickness of each of both side portions of the metal plate in the longitudinal direction, and a number of prepregs located on both side portions of the metal plate in the longitudinal direction and outward of both surfaces of the metal plate in a thickness direction being larger than a number of prepregs located in the intermediate portion of the metal plate in the longitudinal direction and outward of both surfaces of the metal plate in the thickness direction.

According to an embodiment of the present technology, with the aircraft water tank installed on a fuselage via the attachment hole, a load applied to the attachment hole is transferred from the attachment hole to the metal plate.

The load transferred to the metal plate is transferred, at the intermediate portion of the metal plate in the longitudinal direction, to the prepregs forming the attachment plate portion prepreg located outward of both surfaces of the metal plate in the thickness direction.

Additionally, at both side portions of the metal plate in the longitudinal direction, the load is transferred to the prepregs that are larger in number than the prepregs forming the attachment plate portion prepreg and located outward of both surfaces of the intermediate portion of the metal plate in the longitudinal direction.

In other words, even in a case where the metal plate has an increased thickness, the load can be distributively received by more prepregs without an increase in the thickness of the attachment plate portion, using a simple configuration in which the metal plate has an increased thickness at the intermediate portion of the metal plate in the longitudinal direction and a reduced thickness at both side portions of the metal plate in the longitudinal direction.

Thus, even in a case where the tank has an increased capacity and thus an increased weight, the attachment plate portion and the tank installation attachment portion are not damaged, and the aircraft water tank can be installed in a stable state.

DETAILED DESCRIPTION

Now, embodiments of the present technology will be described with reference to the drawings.

First Embodiment

First, a first embodiment is explained.

Figure 1:
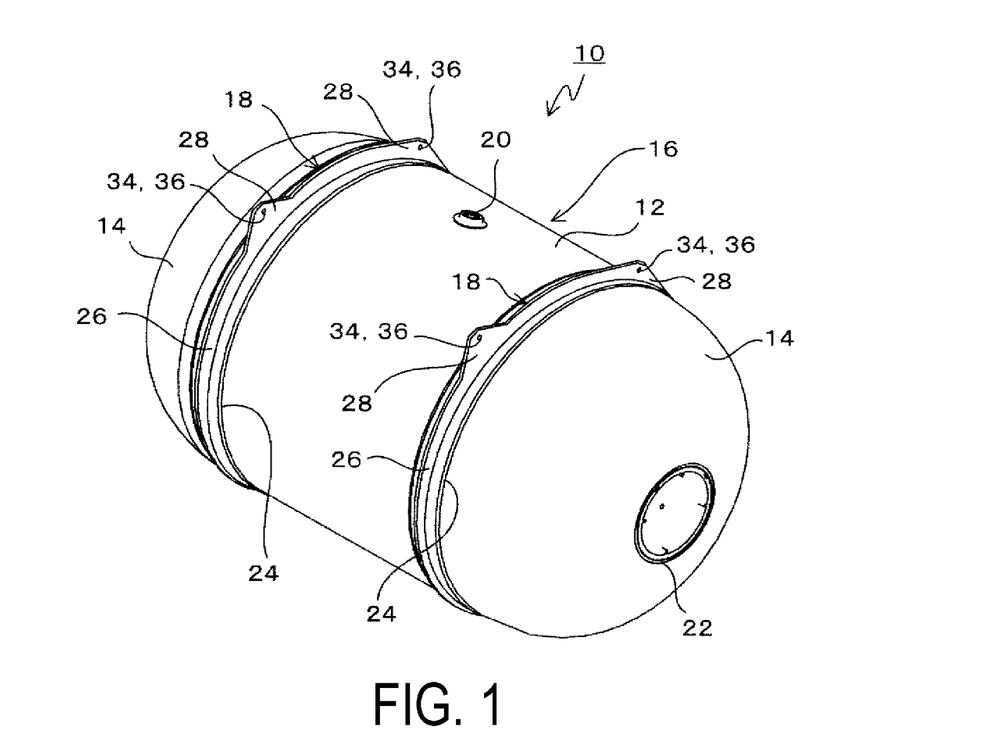
FIG. 1 is a perspective view of an aircraft water tank.

As illustrated in FIG. 1, an aircraft water tank 10 is used to store drinking water, and includes a tank body 16 including a cylindrical body portion 12 and domes 14 disposed on opposite sides of the cylindrical portion 12, and a tank installation attachment portion 18.

A water feeding tank port 20 through which drinking water is fed into the tank body 16 is provided at an upper portion of the body portion 12, a tank port (not illustrated) through which the drinking water in the tank body 16 is fed to different locations in the interior is provided at a lower portion of the body portion 12, and a tank port 22 used to clean the tank body 16 is provided on dome portions 14 on the opposite sides of the tank.

The tank body 16 includes, for example, an innerliner forming a housing space in which the drinking water is stored, a plurality of fiber-reinforced resin layers provided on an outer circumferential surface of the innerliner, and a core layer disposed between the plurality of fiber-reinforced resin layers.

The tank installation attachment portion 18 is provided at a plurality of sections spaced in the axial direction of the body portion 12.

The tank installation attachment portion 18 is a section where the tank body 16 is installed in the fuselage of an aircraft, and includes a base portion 24, a flange 26, and an attachment plate portion 28.

The base portion 24 exhibits an annular shape and extends all over an outer circumferential surface of the body portion 12.

The flange 26 extends on the base portion 24 along the extension direction of the base portion 24, while projecting from the base portion 24 to the outer side of the body portion 12 in the radial direction.

The attachment plate portion 28 is a section to which a member for installation on the fuselage of the aircraft is joined.

The attachment plate portion 28 is provided at a single section in the extension direction of the flange 26 or at a plurality of sections spaced apart in the extension direction of the flange 26, has the same thickness as that of the flange 26, and has a larger height than the flange 26. The attachment plate portion 28 continuously extends from the flange and on the base portion 24 along the extension direction of the base portion 24.

The base section 24 is a section attached to the outer circumferential surface of the body portion 12.

Figure 2:
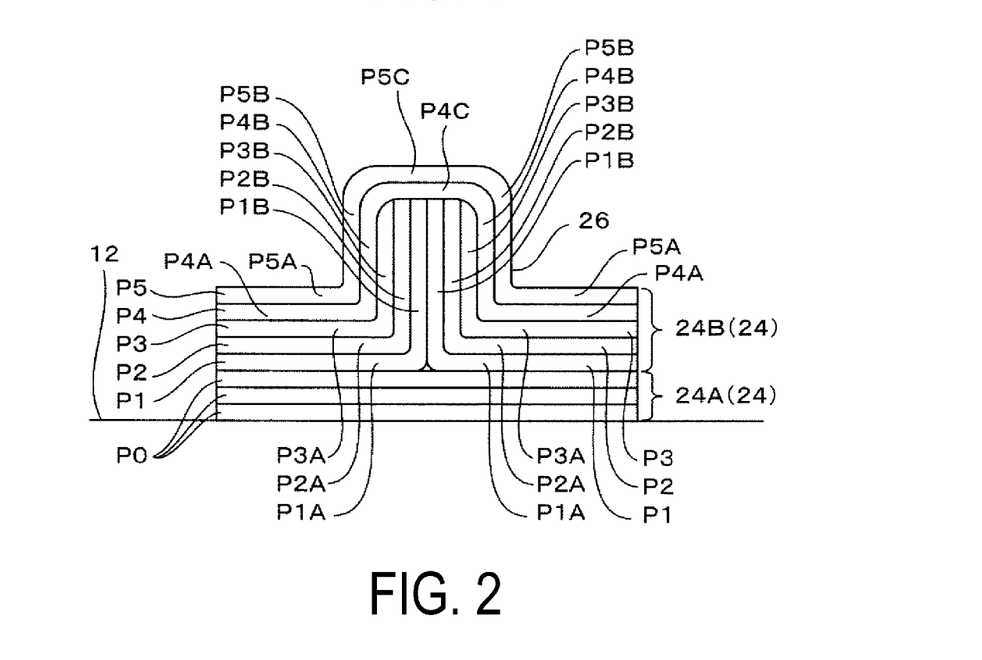
FIG. 2 is a cross-sectional view of a base portion and a flange portion forming a tank installation attachment portion.

As illustrated in FIG. 2, in the present embodiment, the base section 24 includes a lower portion 24A attached to the outer circumferential surface of the body portion 12, and an upper portion 24B attached onto the lower portion 24A.

The lower portion 24A of the base portion 24 is formed by overlaying a plurality of belt-like prepregs P0 (three in the present embodiment) each with a constant width on one another in the radial direction of the body portion 12, bonding the prepregs P0 together, and bonding the prepregs P0 to the body portion 12 all over the circumferential surface of the body portion 12.

Then, on both sides of the lower portion 24A in the width direction, three band-like prepregs P1 to P3, each having a width and a length larger than the width are overlaid on one another. Additionally, the prepregs P1 to P3 are folded at an intermediate portion in the width direction, and two band-like prepregs P4 and P5 are overlaid on the prepregs P1 to P3.

The upper portion 24B of the base portion 24 includes the portion of the prepregs P1 to P5 overlaid on the prepregs P0 forming the lower portion 24A, and the flange 26 includes the portion of the folded prepregs P1 to P5.

Accordingly, in the present embodiment, the upper portion 24B of the base portion 24 and the flange 26 include a total of eight prepregs P1 to P3, P1 to P3, P4, and P5.

In the present embodiment, the prepregs P0 forming the bottom portion 24A of the base portion 24 and the prepregs P1 to P5 forming the upper portion 24B of the base portion 24 and the flange 26 are all the same, reducing costs.

Specifically, on both sides of the lower portion 24A in the width direction, the prepreg end portions P1A to P3A of the prepregs P1 to P3 on both sides overlaid and bonded to the lower portion 24A are located.

In addition, the prepreg intermediate portions P1B to P3B on both sides are located in the center of the lower portion 24A in the width direction; the prepreg intermediate portions P1B to P3B on both sides are formed by folding the prepregs P1 to P3 on both sides outward of the body portion 12 in the radial direction, overlying the prepregs P1 to P3 on one another, and bonding the prepregs P1 to P3 together.

Furthermore, the prepregs P4 and P5 are provided to cover the prepreg end portions P1A to P3A on both sides and the prepreg intermediate portions P1B to P3B on both sides.

Prepregs P4 and P5 include prepreg end portions P4A and P5A, prepreg intermediate portions P4B and P5B, and prepreg upper portions P4C and P5C.

The prepreg end portions P4A and P5A are sections in which the prepregs P4 and P5 are overlaid on and bonded to the prepreg end portions P1A to P3A on both sides.

The prepreg intermediate portions P4B and P5B are sections in which the prepregs P4A and P5A on both sides are folded outward of the body portion 12 in the radial direction and overlaid on and bonded to each other.

The prepreg upper portions P4C and P5C are sections in which radially outer end portions of the prepreg intermediate portions P4B and P5B on both sides are connected together on the prepreg intermediate portions P1B to P3B on both sides.

In other words, the upper portion 24B of base portion 24 includes the prepreg end portions on both sides P1A to P5A, and the lower portion of the prepreg intermediate portions on both sides P1B to P4B projecting outward of body portion 12 in the radial direction between prepreg end portions P1A to P5A on both sides.

Additionally, the flange 26 includes a total of 10 (a plurality of) prepreg intermediate portions P1B to P5B on both sides layered in a direction parallel to the axial direction and two prepreg upper portions P4C and P5C.

The top portion of the flange 26 extends on a single circumference centered at the axial center of the body portion 12 except for the section of the attachment plate portion 28.

Accordingly, the flange 26 is formed by laminating a plurality of (10 in the present embodiment) of prepreg intermediate portions P1B to P5B, P1B to P5B in a direction parallel to the axial direction of the body portion 12, project outward in the radial direction of the body portion 12 from the base portion 24, and extends in the extension direction of the base portion 24.

As illustrated in FIG. 1, the attachment plate portion 28 is provided on the flange 26 at two sections spaced from each other in the circumferential direction. Note that the number of attachment plate portions 28 may be one or three or more and changes depending on the aspect in which the aircraft water tank 10 is installed.

Figure 3:
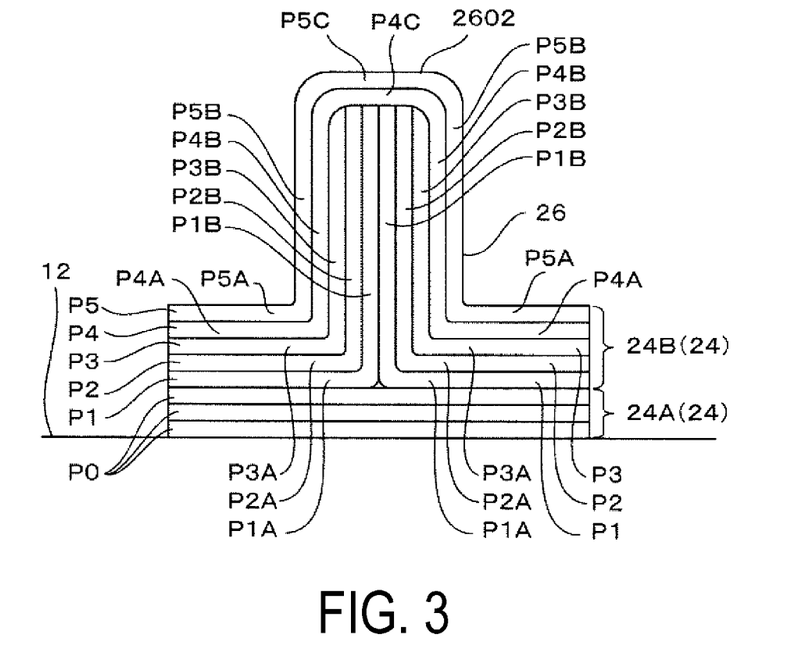
FIG. 3 is a cross-sectional view of the base portion and flange portion proximate to the attachment plate portion.
Figure 4:
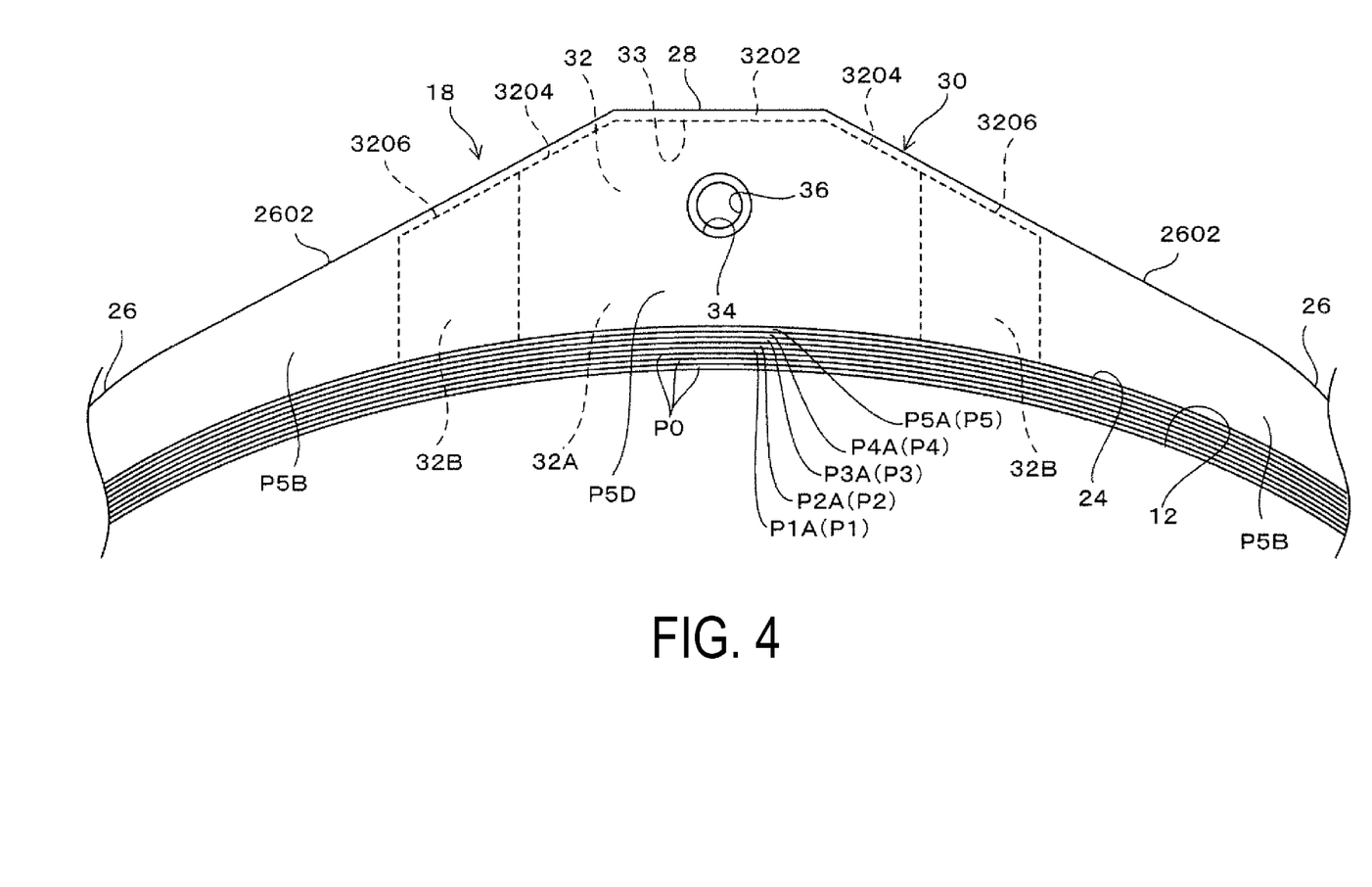
FIG. 4 is a front view of the attachment plate portion.

The attachment plate portion 28 extends continuously on the base portion 24 along the extension direction of the base portion 24, and as illustrated in FIGS. 3 and 4, the sections of the flanges 26 located at both ends in the extension direction of each attachment plate portion 28 are formed as inclined portions 2602 having a height gradually increasing from the base portion 24 as the flanges approach the attachment plate portion 28.

As illustrated in FIGS. 4, 5, and 7 to 9, the attachment plate portion 28 includes an attachment plate portion prepreg 30, a metal plate 32, and an attachment hole 34, in other words, the attachment plate portion 28 is a section in which the metal plate 32 is embedded in the attachment plate portion prepreg 30 formed by increasing the height of the flange 26, and both ends of the metal plate 32 are located at the respective ends of the attachment plate portion 28 in the circumferential direction of the base portion 24.

Figure 7:
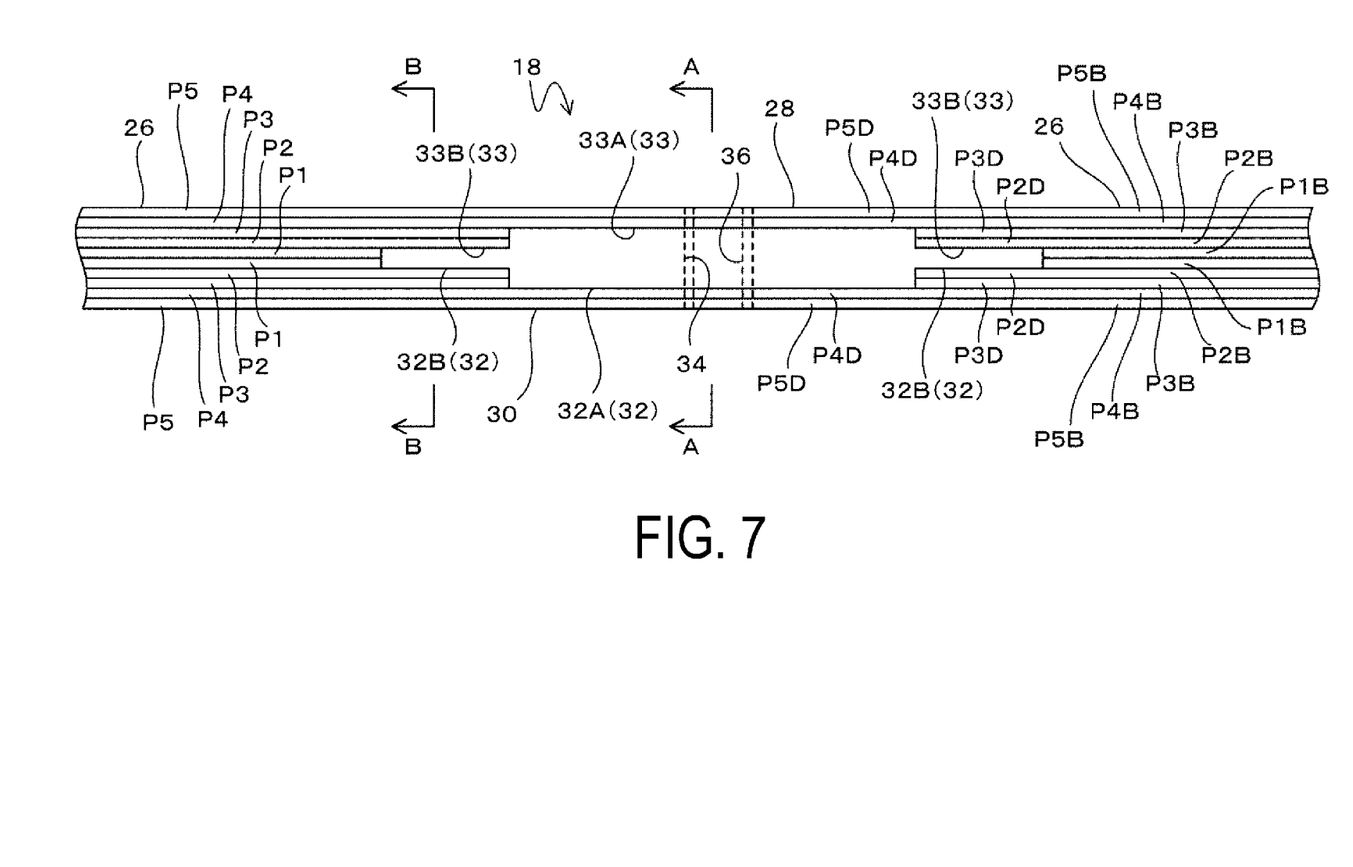
FIG. 7 is a cross-sectional plan view of the attachment plate portion with a middle of the attachment plate portion in the height direction cut away.
Figure 8:
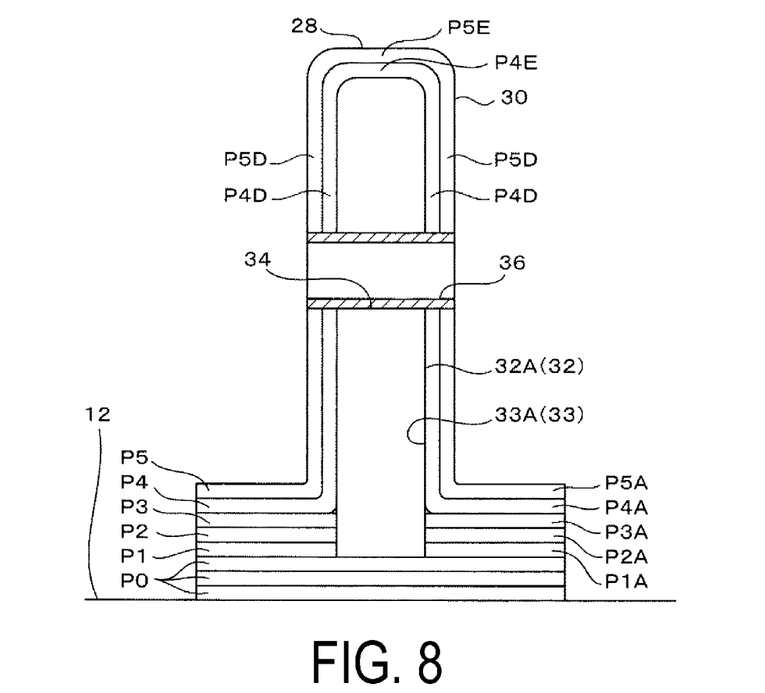
FIG. 8 is a cross-sectional view taken along A-A in FIG. 7.
Figure 9:
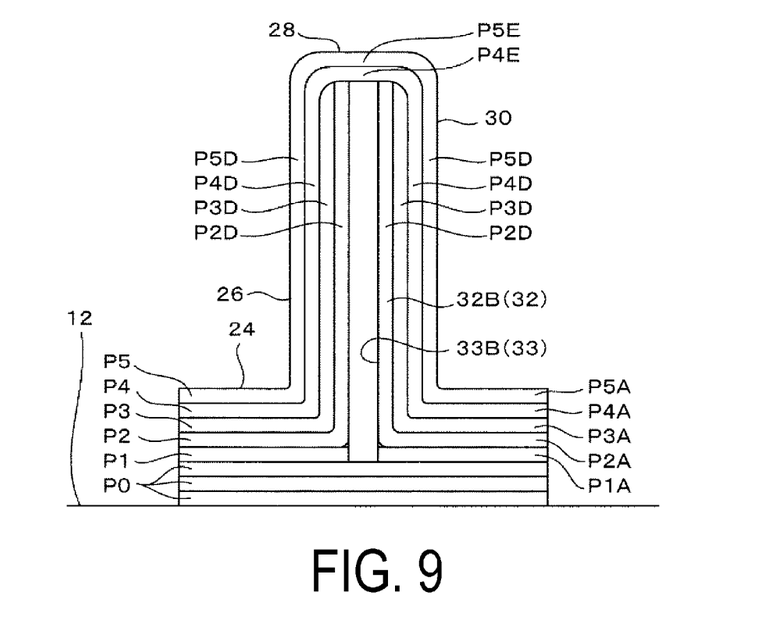
FIG. 9 is a cross-sectional view taken along B-B in FIG. 7.

As illustrated in FIGS. 7 to 9, the attachment plate portion prepreg 30 includes prepreg intermediate portions P2B to P5B forming the flange 26, prepreg projection portions P2D to P5D, P2D to P5D projecting outward from the flange 26 in the radial direction of the body portion 12, and prepreg upper portions P4E and P5E connecting upper portions of the prepreg projection portions P2D to P5D, P2D to P5D together.

Note that prepreg projection portions corresponding to the prepreg intermediate portions P1B, P1B are cut away and are not present in the section of the attachment plate portion 28, the intermediate portions P1B, P1B being located in the central portion, in the thickness direction, of the prepreg intermediate portions P1B to P5B, P1B to P5B forming the flange 26.

As illustrated in FIGS. 4, 5, and 7 to 9, the metal plate 32 is disposed housed in a housing space 33 inside the attachment plate portion prepreg 30.

Various known metals such as aluminum alloys which are light in weight and rigid can be used as the metal plate 32.

The metal plate 32 has a length along the circumferential direction of the body portion 12, a thickness along a direction parallel to the axial direction of the body portion 12, and a height projecting outward in the radial direction of the body portion 12.

As illustrated in FIG. 8, the attachment hole 34 is formed in an intermediate portion of the metal plate 32 in the longitudinal direction, and the attachment hole 34 is formed to extend through the prepreg projection portions P4D and P5D, P4D and P5D and the metal plate 32 in the direction parallel to the axial direction of the body portion 12.

As illustrated in FIGS. 6 to 9, the thickness of the intermediate portion of the metal plate 32 in the longitudinal direction has a dimension larger than the dimension of the thickness of both side portions of the metal plate 32 in the longitudinal direction.

Figure 6A:
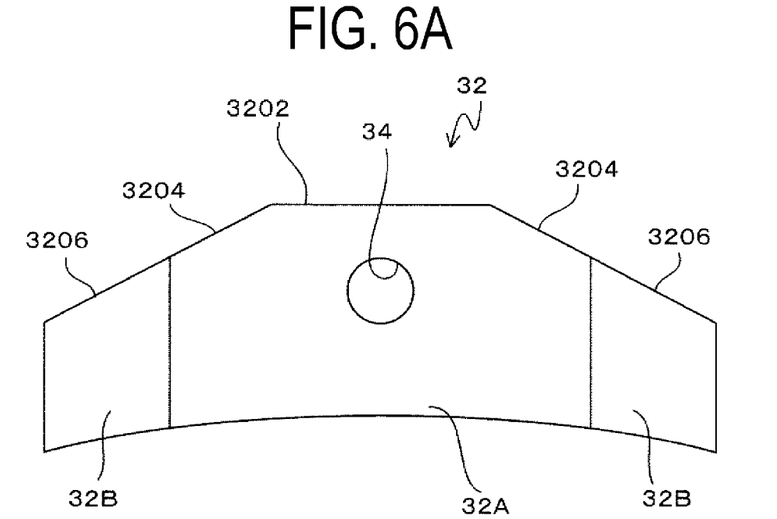
FIG. 6A is a front view of a metal plate.
Figure 6B:
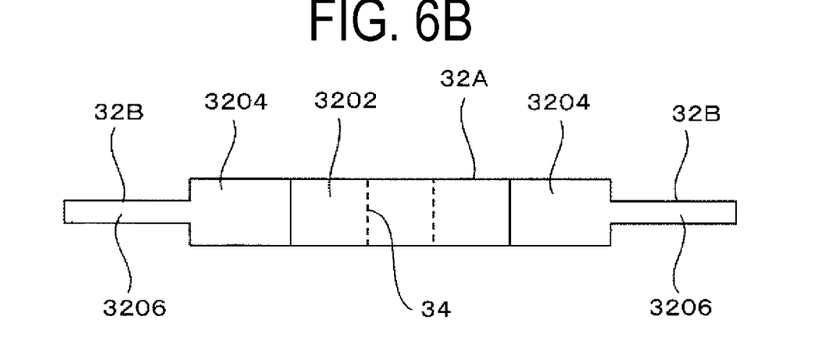
FIG. 6B is a plan view of the metal plate.

In the present embodiment, the metal plate 32 includes a thick wall portion 32A forming the intermediate portion of the metal plate 32 in the longitudinal direction, and a thin wall portion 32B forming both side portions of the metal plate 32 in the longitudinal direction and having a smaller thickness than the thick wall portion 32A.

The thick wall portion 32A has a uniform thickness, and the thin wall portion 32B also has a uniform thickness.

The thin wall portion 32B projects from a thickness-direction central portion of the thick wall portion 32A in the longitudinal direction of the metal plate 32.

As illustrated in FIG. 7, the thick wall portion 32A corresponds to the thickness of six prepregs P1, P1, P2, P2, and P3, and the thin wall portion 32B corresponds to the thickness of the two prepregs P1, P1.

Figure 5:
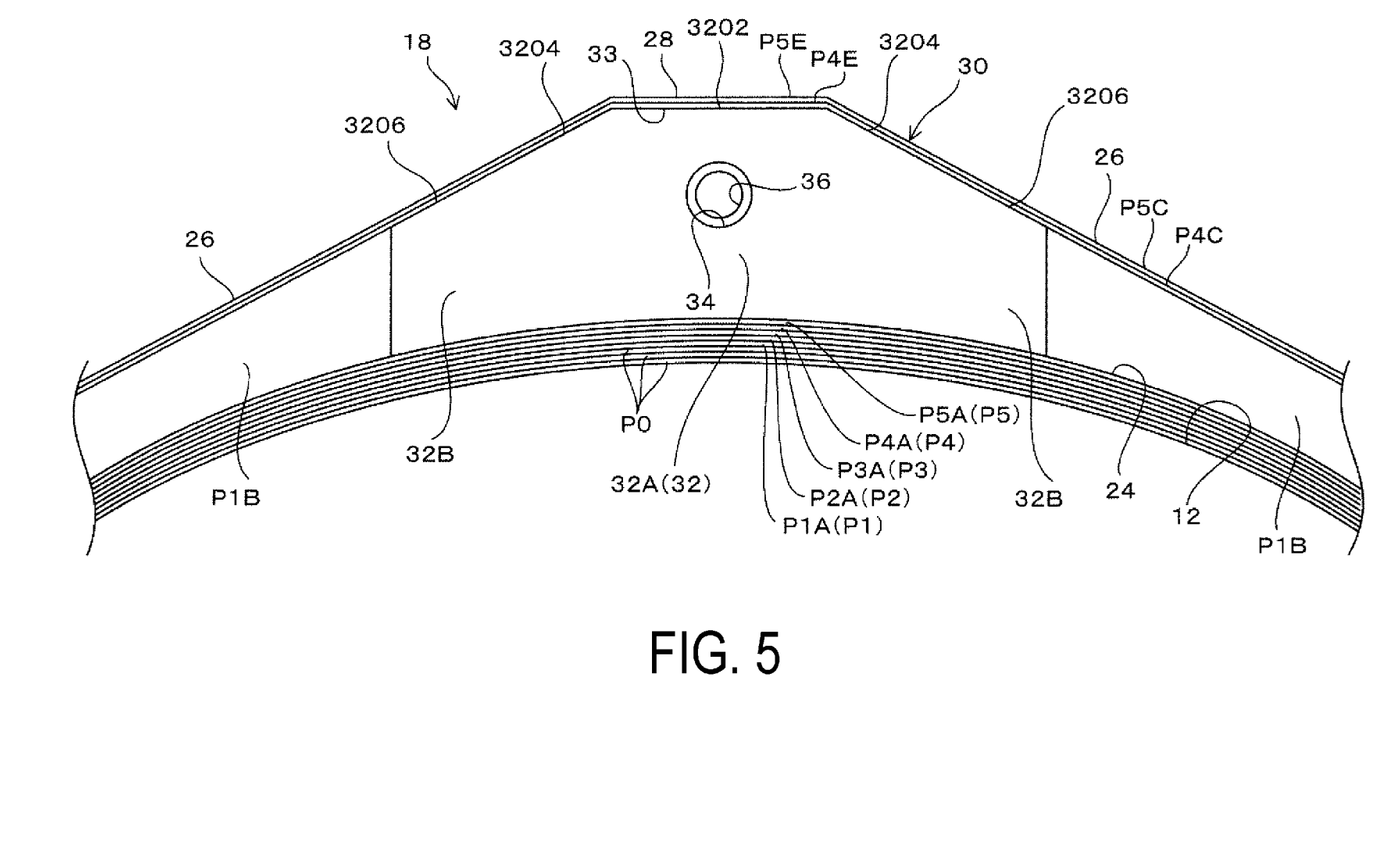
FIG. 5 is a cross-sectional view of the attachment plate portion with the center of the attachment plate portion in the thickness direction cut away at a plane orthogonal to the axial direction of the body portion.

Additionally, as illustrated in FIGS. 4, 5 and 6A, a section of the thick wall portion 32A provided with the attachment hole 34 is formed as a top portion 3202 having a larger height than any other location of the thick wall portion 32A, the height extending outward of the base portion 24 in the radial direction, and the thick wall portion 32A on both sides of the top portion 3202 in the extension direction of the thick wall portion 32A is formed with an inclined portion 3204 that gradually decreases in height away from the top portion 3202.

In addition, the thin wall portion 32B is formed as an inclined portion 3206 with a height continuous with the height of the inclined portion 3204 of the thick wall portion 32A, and is configured to allow, in a case where a load is applied to the attachment hole 34, the prepreg projection portions P2D to P5D located on both sides of the attachment hole 34 to distributively receive the load.

As illustrated in FIG. 7, a housing space 33 inside the attachment plate portion prepreg 30 in which the metal plate 32 is housed is formed by cutting away the corresponding sections of the prepregs P1, P1, P2, P2, P3, and P3.

Figure 10:
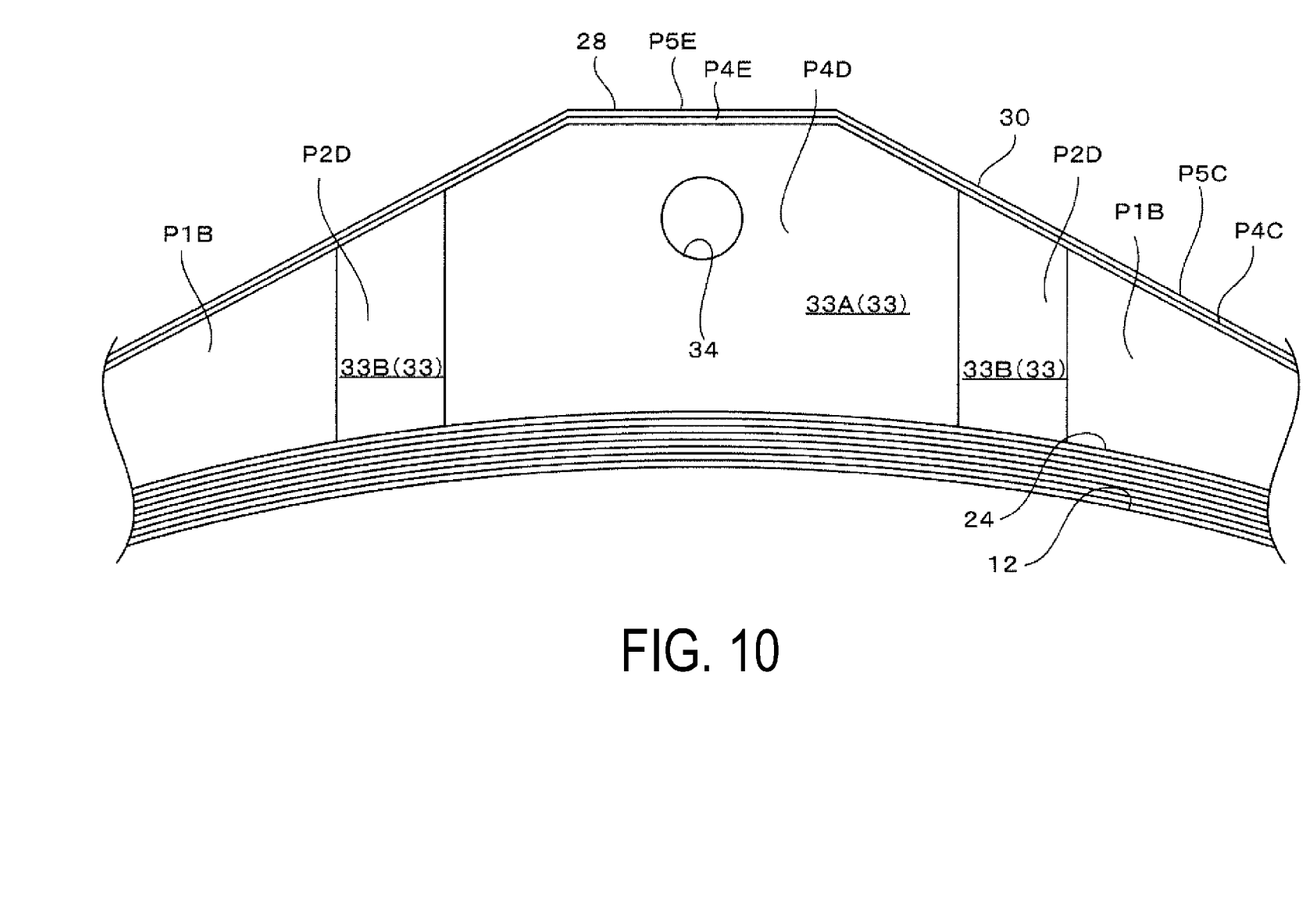
FIG. 10 is an explanatory diagram of a housing space for housing a thick wall portion.

Specifically, as illustrated in FIGS. 7 and 10, a housing space 33A housing the thick wall portion 32A of the metal plate 32 is formed by cutting away a total of six prepreg projection portions including two prepreg projection portions not illustrated and corresponding to the prepreg intermediate portions P1B, P1B as described above, and four prepreg projection portions P2D, P3D, P2D, and P3D included in the prepreg projection portions P2D to P5D, P2D to P5D.

Additionally, as illustrated in FIG. 7, a housing space 33B housing the thin wall portion 32B of the metal plate 32 is formed by cutting away two prepreg projection portions not illustrated and corresponding to the prepreg intermediate portions P1B, P1B as described above.

Thus, as illustrated in FIGS. 7 and 8, with the metal plate 32 housed in the housing space 33, each of both surfaces of the thick wall portion 32A is held by the two prepreg projection portions P4D and P5D in a sandwiching manner.

Additionally, as illustrated in FIGS. 7 and 9, each of both surfaces of the thin wall portion 32B is held by four prepregs P2D to P5D in a sandwiching manner.

Additionally, as illustrated in FIGS. 8 and 9, an upper surface of the thick wall portion 32A and an upper surface of the thin wall portion 32B are covered by two prepreg upper portions P4E and P5E.

As described above, the thickness of the thick wall portion 32A and the thin wall portion 32B each have a dimension that is an integral multiple of the thickness of the prepreg, and this is advantageous in easily forming the housing space 33 by an easy operation of simply increasing or reducing the number of prepregs in a section at a boundary between the thin wall portion 32B and the flange 26 and in a section at a boundary between the thick wall portion 32A and the thin wall portion 32B, and is also advantageous in easily forming a continuous surface with no step at the section of the boundary between the thin wall portion 32B and the flange 26, and at the section of the boundary between the thick wall portion 32A and the thin wall portion 32B.

In addition, an equal number of prepreg projection portions P4D and P5D are located on both sides of the thick wall portion 32A, and an equal number of prepreg projection portions P2D, P3D, P4D, and P5D are located on both sides of the thin wall portion 32B. In a plan view, the structure of the attachment plate portion 28 has, at the section of the metal plate 32, a left-right symmetric shape with respect to the center line of the thickness of the metal plate 32.

This is advantageous in uniformly receiving, in a case where a force is applied to the attachment hole 34, the corresponding load at the attachment plate portion 28, and is advantageous in improving the durability of the attachment plate portion 28.

Note that the prepreg upper portions P4E and P5E may be omitted or that prepreg upper portions P4E and P5E may be omitted, with another prepreg used to cover an upper surface of the metal plate 32 but that the upper surface of the metal plate 32 is advantageously easily covered in a case where the prepreg projection portions located on both surfaces of the metal plate 32 in the thickness direction project outward from the base portion 24 in the radial direction of the body portion 12 along both surfaces of the metal plate 32 in the thickness direction and are folded and connected together on the upper surface of the metal plate 32 as in the embodiment.

A metal bush 36 having a height that is the same dimension as that of the thickness of the attachment plate portion 28 is inserted into the attachment hole 34 and fixed.

Insertion of a bolt through the bush 36 causes the bush 36 to distribute a load applied to the attachment hole 34 in a case where the aircraft water tank 10 is installed, thus improving durability.

Various known metal materials such as steel materials which are rigid can be used for the bush 36.

Note that the bush 36 are provided as necessary and can be omitted.

The aircraft water tank 10 is installed, for example, by being suspended from the fuselage via bolts inserted through the attachment holes 34 in the two tank installation attachment portions 18 provided at the respective locations in the longitudinal direction of the body portion 12, and in the present embodiment, via bolts inserted through the bushes 36.

According to the aircraft water tank 10 of the first embodiment, for example, with the aircraft water tank 10 suspended in the fuselage via the bushes 36, a load applied to each bush 36 is transferred from the bush 36 and the attachment hole 34 to the metal plate 32.

In addition, the load transferred to metal plate 32 is transferred, at the intermediate portion of the metal plate 32 in the longitudinal direction, to the prepregs P4 and P5 forming the attachment plate portion prepreg 30 located on both surfaces of the metal plate 32 in the thickness direction.

In addition, the load transferred to metal plate 32 is transferred, at both side portions of the metal plate 32 in the longitudinal direction, to the prepregs P2, P3, P4, and P5, which are larger in number than the prepregs P4 and P5 forming the attachment plate portion prepreg 30 and located outward of both surfaces of the intermediate portion of the metal plate 32 in the longitudinal direction.

In particular, the load transferred to metal plate 32 is transferred, at the section of the thick wall portion 32A of the metal plate 32, to a total of four prepreg projection portions P4D, P5D, P4D, and P5D, and is transferred, at the section of the thin wall portion 32B, to a total of eight prepreg projection portions P2D, P3D, P4D, P5D, P2D, P3D, P4D, and P5D.

In other words, even in a case where the metal plate 32 has an increased thickness, the load can be distributively received by more prepregs without an increase in the thickness of the attachment plate portion 28, using a simple configuration in which the metal plate has an increased thickness at the intermediate portion in the longitudinal direction and a reduced thickness at both side portions in the longitudinal direction.

Accordingly, even in a case where the tank has an increased capacity and thus an increased weight, the attachment plate portion 28 and the tank installation attachment portion 18 are not damaged, and the aircraft water tank 10 can be installed in a stable state.

In addition, the thickness of the thick wall portion 32A and the thin wall portion 32B are each an integral multiple of the number of prepregs, and thus the housing spaces 33A and 33B in which the metal plate 32 provided on the attachment plate portion 28 is housed can be easily formed, in a case where the five prepregs P1 to P5 are layered, by cutting away the prepreg projection portions P2D and P3D and two prepreg projection portions not illustrated and corresponding to the prepreg intermediate portions P1B, P1B located in the middle of the attachment plate portion 28 in the width direction. This is advantageous in improving the efficiency of the operation of manufacturing the tank installation attachment 18.

In addition, this configuration is advantageous in easily forming a continuous surface with no steps at the section of the boundary between the thin wall portion 32B and the flange 26 and at the section of the boundary between the thick wall portion 32A and the thin wall portion 32B.

In addition, in the present embodiment, the thin wall portion 32B extends from the center in the thickness direction of the thick wall portion 32A along the extension direction of the base portion 24. Thus, the thin wall portion 32B can be supported by an equal number of prepregs on both sides of the thin wall portion 32B in the thickness direction. This is advantageous in improving the durability of the attachment plate portion 28.

Second Embodiment

Now, a second embodiment will be described with reference to FIG. 11A.

Note that, in the embodiments described below, the same sections and members as those of the first embodiment are denoted by the same reference signs denote and that the description of these sections and members is omitted, with different sections focused on.

The second embodiment differs from the first embodiment in that the thin wall portion 32B is disposed biased toward one end portion of the thick wall portion 32A in the thickness direction, and one surface of both surfaces of the thick wall portion 32A in the thickness direction located flush with one surface of both surfaces of the thin wall portion 32B in the thickness direction and that, instead of the eight prepregs in the first embodiment, six prepregs are used for the upper portion 24B of the base portion 24 and the flange 26 and that the thickness of the thick wall portion 32A corresponds to the thickness of the four prepregs instead of the six prepregs in the first embodiment.

In the second embodiment, two band-like prepregs P1 and P2 are overlaid on both sides of the lower portion 24A in the width direction, and folded at the intermediate portions of the prepregs in the width direction, and two band-like prepregs P3 and P4 are further overlaid on the prepregs P1 and P2.

The portion of the prepregs P1 to P4 thus overlaid on the lower portion 24A forms the upper portion 24B of the base portion 24, and the portion of the folded prepregs P1 to P4 forms the flange 26.

Accordingly, in the present embodiment, the upper portion 24B of the base portion 24 and the flange 26 include a total of six prepregs P1, P2, P1, P2, P3, and P4.

In the second embodiment, on both sides of the bottom portion 24A of the base portion 24 in the width direction, the prepreg end portions NA to P4A formed by engaging the four prepregs P1 to P4 with one another instead of the five prepregs in the first embodiment form the upper portion 24B of the base portion 24.

Additionally, the flange 26 includes a total of eight (a plurality of) prepreg intermediate portions P1B to P4B, P1B to P4B formed by folding and layering the intermediate portions of the prepregs P1, P2, P3, and P4 in the width direction, and two prepreg upper portions connecting radially outer end portions of the prepreg intermediate portions P3B and P4B on prepreg intermediate portions P1B, P2B, P1B, and P2B.

Figure 11A:
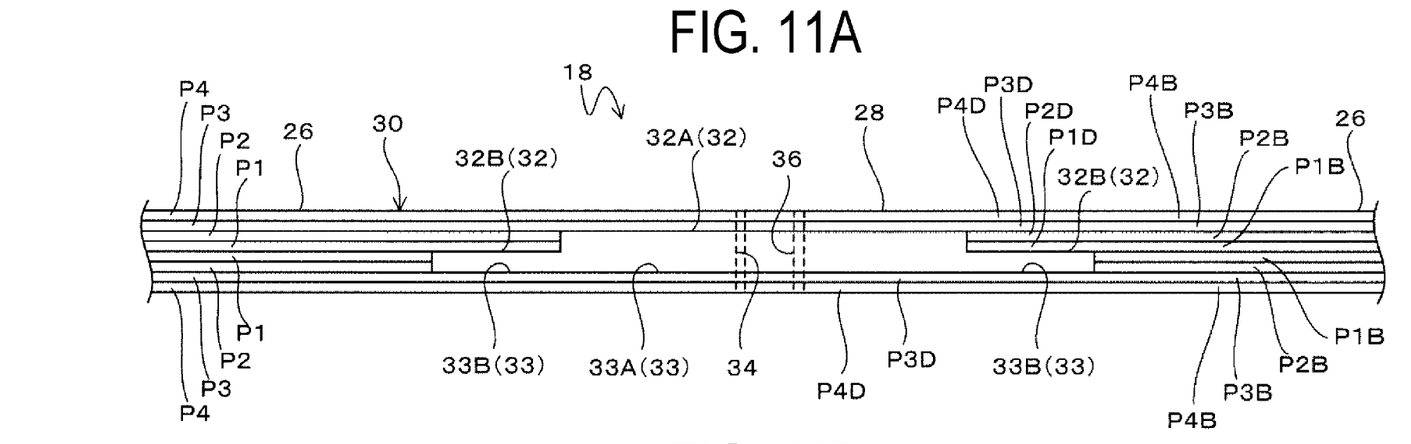
FIG. 11A is a cross-sectional plan view of an attachment plate portion according to a second embodiment with a middle of the attachment plate portion in a height direction cut away.

As illustrated in FIG. 11A, in the attachment plate portion 28, prepreg projection portions P3D and P4D formed by projecting the prepreg intermediate portions P3B and P4B forming the flange 26 are located on the both surfaces of the thick wall portion 32A in the thickness direction.

Additionally, the prepreg projection portions P3D and P4D are located on one surface of the thin wall portion 32B in the thickness direction, whereas the prepreg projection portions P1D to P4D are located on the other surface of the thin wall portion 32B in the thickness direction.

The upper portions of the prepreg projection portions P1D and P2D located on the other surface in the thickness direction are cut off flush with the upper surface of metal plate 32, and the upper portion of thick wall portion 32A and the upper portion of thin wall portion 32B are covered with a prepreg upper portion connecting the prepreg projection portions P3D and P4D on both sides together.

According to the aircraft water tank 10 of the second embodiment as described above, with the aircraft water tank 10 is suspended by the fuselage via the bushes 36, a load applied to each bush 36 is transferred from the bush 36 and the attachment hole 34 to the metal plate 32 as is the case with the first embodiment.

The load transferred to the metal plate 32 is transferred, at the thick wall portion 32A, to the two prepreg projection portions P3D and P4D on the both surfaces of the thick wall portion 32A and is transferred, at the thin wall portion 32B, to a total of six prepreg projection portions P1D to P4D, P3D, and P4D on the opposite sides of the thin wall portion 32B and from the metal plate 32 to the flange 26 at both end portions of the attachment plate portion 28 in the longitudinal direction.

In other words, even in a case where the metal plate 32 has an increased thickness, the metal plate 32 can be sandwiched between more prepregs to allow the load to be distributively received by the more prepregs without an increase in the thickness of the attachment plate portion 28, by using a simple configuration in which the metal plate 32 is provided with the thick wall portion 32A and the thin wall portion 32B.

Accordingly, even in a case where the tank has an increased capacity and thus an increased weight, the attachment plate portion 28 and the tank installation attachment portion 18 are not damaged, and the aircraft water tank 10 can be installed in a stable state.

Third Embodiment

Figure 11B:
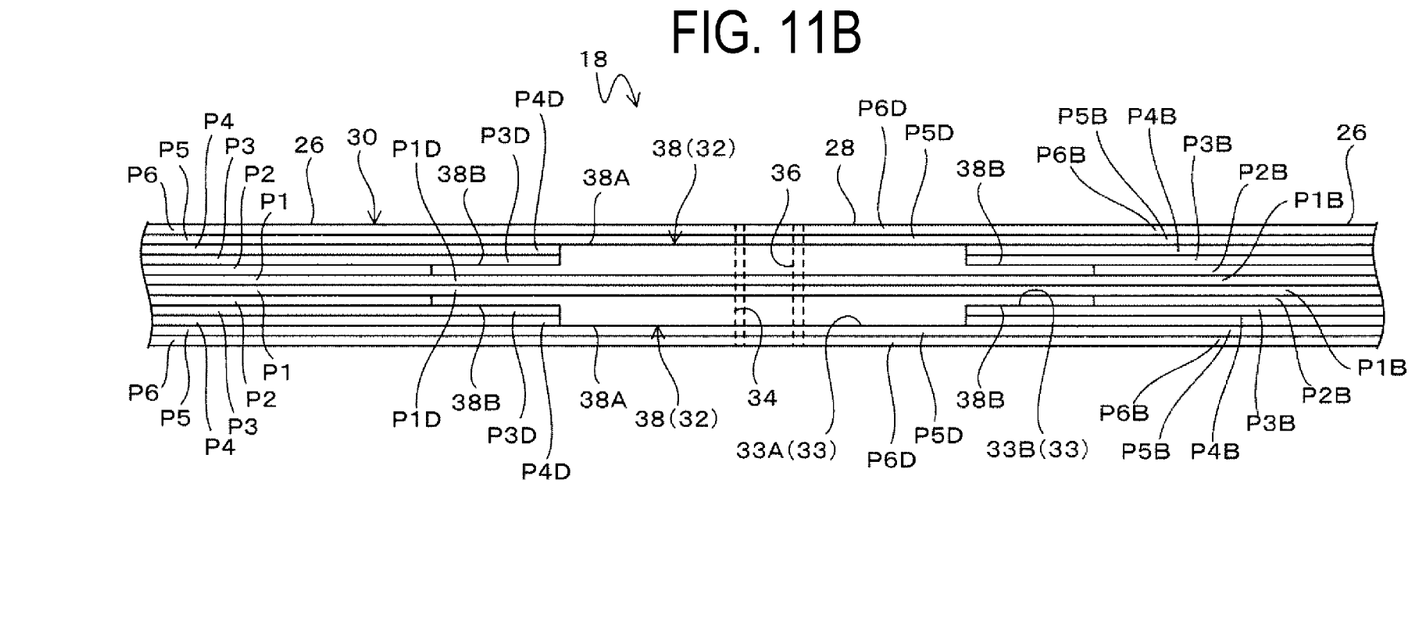
FIG. 11B is a cross-sectional plan view of an attachment plate portion according to a third embodiment with the middle of the attachment plate portion in the height direction cut away.

Now, a third embodiment will be described with reference to FIG. 11B.

The third embodiment differs from the third embodiment in that the metal plate 32 includes two division metal plates 38 located opposite to each other at a distance from each other in the direction parallel to the axial direction of the body portion 12 and extending in the circumferential direction of the body portion 12, with each of the metal plates 38 including a thick wall portion 38A forming the intermediate portion of the division metal plate 38 in the longitudinal direction and a thin wall portion 38B forming both side portions of the division metal plate 38 in the longitudinal direction and having a smaller thickness than the thick wall portion 38A and that instead of the eight prepregs in the first embodiment, 10 prepregs are used for the upper portion 24B of the base portion 24 and the flange 26 and that the thickness of the thick wall portion 38A corresponds to the thickness of three prepregs instead of the six prepregs in the first embodiment.

At the opposing surfaces of both surfaces of the division metal plates 38, the thick wall portion 38A and the thin wall portion 38B are flush with each other.

In the third embodiment, four band-like prepregs P1, P2, P3, and P4 are overlaid on both sides of the lower portion 24A of the base portion 24 in the width direction, and folded at the intermediate portions of the prepregs in the width direction, and two band-like prepregs P5 and P6 are further overlaid on the prepregs P1, P2, P3, and P4.

The portion of the prepregs P1 to P6 thus overlaid on the lower portion 24A forms the upper portion 24B of the base portion 24, and the portion of the folded prepregs P1 to P6 forms the flange 26.

Thus, in this embodiment, the upper portion 24B of the base portion 24 and the flange 26 include a total of 10 prepregs P1 P2, P3, P4, P1, P2, P3, P4, P5, and P6.

The thick wall portion 38A of the division metal plate 38 corresponds to the thickness of the three prepregs P2, P3, and P4, and the thin wall portion 38B corresponds to the thickness of one prepreg P2.

Note that, in each of the division metal plates 38, the height of the thin wall portion 38B connected to both ends of the thick wall portion 38A in the extension direction and extending outward of the base portion in the radial direction continuously extends from both ends of the thick wall portion 38A in the extension direction.

In the attachment plate portion 28, two prepreg projection portions P1D, P1D formed by projecting the prepreg intermediate portions P1B, P1B forming the flange 26 are located between the inner surfaces of the thick wall portion 38A and the thin wall portion 38B that are flush with each other.

Additionally, prepreg projection portions P5D and P6D formed by projecting prepreg intermediate portions P5B and P6B forming the flange 26 are located on an outer surface of the thick wall portion 38A opposite to the surface on which the thick wall portion 38A and the thin wall portion 38B of each division metal plate 38 are flush with each other, and the prepreg projection portions P3D to P6D formed by projecting the prepreg intermediate portions P3B to P6B forming the flange 26 are located on an outer surface of the thin wall portion 38B.

Note that the upper portion of the prepreg projection portion P1D located between the two division metal plates 38 and the upper portions of the prepreg projection portions P3D and P4D located on the outer surface of the thin wall portion 38B are cut off flush with the upper surface of the metal plate 32 and that the upper portion of the thick wall portion 38A and the upper portion of the thin wall portion 38B are covered by a prepreg upper portion connecting the prepreg projection portions P5D and P6D on both sides.

According to the aircraft water tank 10 of the third embodiment as well, with the aircraft water tank 10 suspended by the fuselage via the bushes 36, a load applied to each bush 36 is transferred from the bush 36 and the attachment hole 34 to the metal plate 32, as is the case with the first embodiment.

The load transferred to the metal plate 32 is transferred, at the thick wall portion 38A, to the two prepreg projection portions P5D and P6D on both surfaces of the thick wall 38A, and transferred to the two prepreg projection portions P1D, P1D between the thick wall portions 38A.

In addition, the load is transferred, at the thin wall portion 38B, to the four prepreg projection portions P3D to P6D on both sides of the thin wall portion 38B, and transferred to the two prepreg projection portions P1D, P1D between the thin wall portions 38B, and transferred from the metal plate 32 to the flange 26 at both ends of the attachment plate portion 28 in the longitudinal direction.

In other words, even in a case where the metal plate 32 has an increased thickness, the metal plate 32 can be sandwiched between more prepregs to allow the load to be distributively received by the more prepregs without an increase in the thickness of the attachment plate portion 28, by using a simple configuration in which the metal plate 32 is provided with the thick wall portion 38A and the thin wall portion 38B.

Accordingly, even in a case where the tank has an increased capacity and thus an increased weight, the attachment plate portion 28 and the tank installation attachment portion 18 are not damaged, and the aircraft water tank 10 can be installed in a stable state.

Fourth Embodiment

Figure 12:
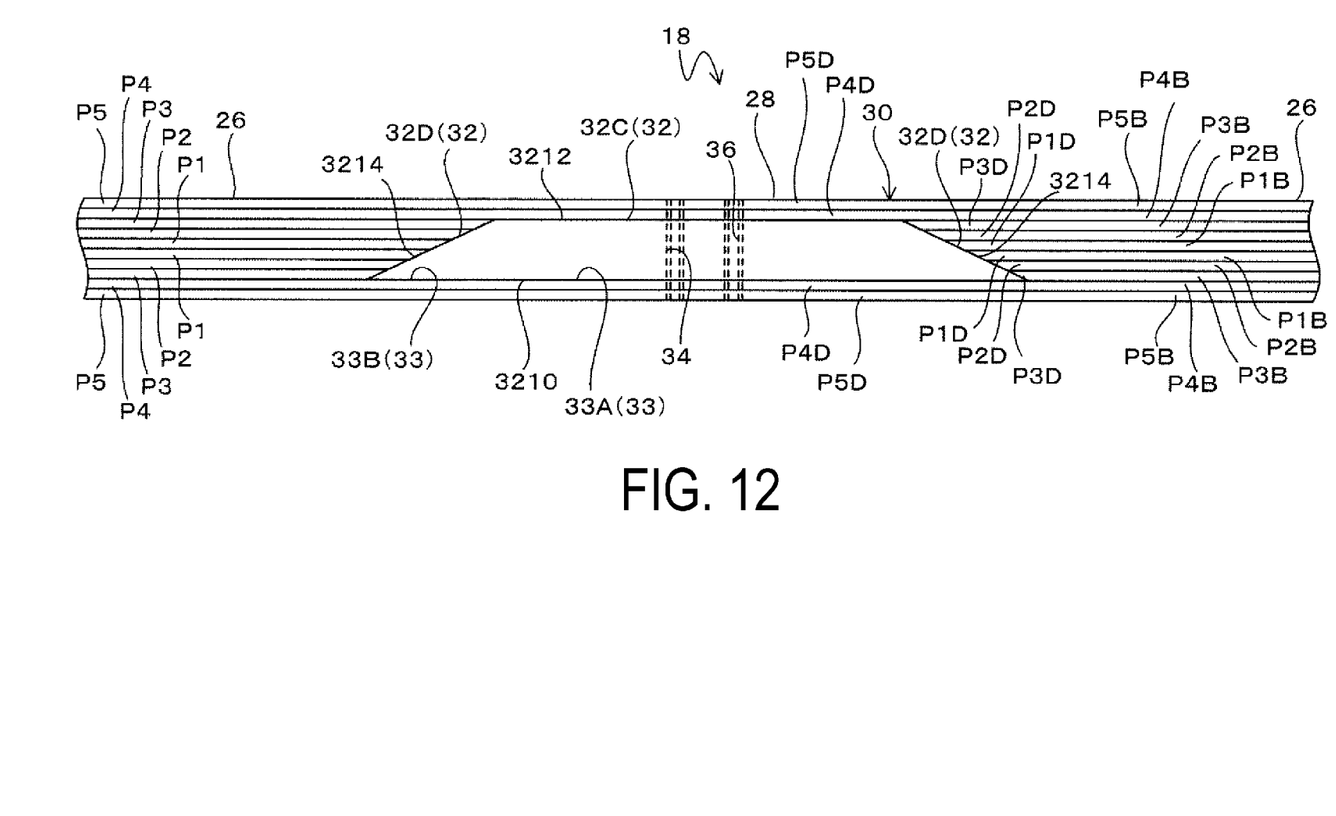
FIG. 12 is a cross-sectional plan view of an attachment plate portion according to a fourth embodiment with a middle of the attachment plate portion in the height direction cut away.

Now, a fourth embodiment will be described with reference to FIG. 12.

The fourth embodiment differs from the first embodiment in that the metal plate 32 includes a thick wall portion 32C forms the intermediate portion of the metal plate 32 in the longitudinal direction and having a uniform thickness, and a thin wall portion 32D forming both side portions of the metal plate 32 in the longitudinal direction and has a thickness gradually decreasing away from the thick wall portion 32C along the longitudinal direction of the metal plate 32.

One surface of the metal plate 32 in the thickness direction includes the thick wall portion 32C and the thin wall portion 32D formed flush with each other on the same surface (flat surface) 3210, and the intermediate portion of the other surface in the longitudinal direction is formed as a surface 3212 of the thick wall portion 32C, and both side portions of the other surface in the longitudinal direction are formed as inclined surfaces 3214 forming the thin wall portions 32D.

Note that the height of the thin wall portion 32D connected to both ends of the thick wall portion 32C in the extension direction and extending outward of the base portion in the radial direction continuously extends from both ends of the thick wall portion 32C in the extension direction.

In the fourth embodiment, three band-like prepregs P1, P2, and P3 are overlaid on both sides of the lower portion 24A of the base portion 24 in the width direction, and folded at the intermediate portions of the prepregs in the width direction, and two band-like prepregs P4 and P5 are further overlaid on the prepregs P1, P2, and P3.

The portion of the prepregs P1 to P5 thus overlaid on the lower portion 24A forms the upper portion 24B of the base portion 24, and the portion of the folded prepregs P1 to P5 forms the flange 26.

Accordingly, in the present embodiment, the upper portion 24B of the base portion 24 and the flange 26 include a total of eight prepregs P1, P2, P3, P1, P2, P3, P4, and P5.

In the attachment plate portion 28, the prepreg projection portions P4D and P5D formed by projecting the prepreg intermediate portions P4B and P5B forming the flange 26 are located on a surface 3210 of the thick wall portion 32C and thin wall portion 32D flush with each other and on a surface 3212 of the thick wall portion 32C.

Additionally, the prepreg projection portions P3D, P2D, P1D, P1D, P2D, P3D, P4D, and P5D formed by projecting the prepreg intermediate portions P1B to P5B are projecting are located on an inclined surface 3214, and the prepreg projection portions decrease in the order of P3D, P2D, P1D, P1D, and P2D as the prepreg projection portions approach the thick wall portion 32C.

The prepreg projection portions P3D, P2D, P1D, P1D, P2D, and P3D located on the inclined surface 3214 are cut off flush with the upper surface of metal plate 32, and the upper portion B of the thick wall portion 32C and the upper portion of the thin wall portion 32C are covered by a prepreg upper portion connecting the prepreg projection portions P4D and P5D on both sides.

According to the aircraft water tank 10 of the fourth embodiment described above, with the aircraft water tank 10 suspended by the fuselage via the bushes 36, a load applied to each bush 36 is transferred from the bush 36 and the attachment hole 34 to the metal plate 32.

The load transferred to the metal plate 32 is transferred, at the thick wall portion 32C, to the two prepreg projection portions P4D and P5D on both sides of the thick wall portion 32C, transferred to the two prepreg projection portions P4D and P5D at one surface 3212 of the thin wall portion 32D, transferred to the prepreg projection portions P4D and P5D at the inclined surface 3214 of the thin wall portion 32D, and transferred to the prepreg projection portions P3D, P2D, P1D, P1/D, P2D, and P3D in this order as the distance from the thick wall portion 32C increases.

In other words, even in a case where the metal plate 32 has an increased thickness, the metal plate 32 can be sandwiched between more prepregs to allow the load to be distributively received by the more prepregs without an increase in the thickness of the attachment plate portion 28, by using a simple configuration in which the metal plate 32 is provided with the thick wall portion 32C and the thin wall portion 32D.

Accordingly, even in a case where the tank has an increased capacity and thus an increased weight, the attachment plate portion 28 and the tank installation attachment portion 18 are not damaged, and the aircraft water tank 10 can be installed in a stable state.

The invention claimed is:

1. An aircraft water tank comprising a tank installation attachment portion provided on a cylindrical body portion of a tank body,
   the tank installation attachment portion comprising:
   a base portion that includes a plurality of prepregs being band-like and layered on an outer circumferential surface of the body portion in a radial direction of the body portion, and that extends in a circumferential direction of the outer circumferential surface;
   a flange that is formed by folding, from the base portion and outward of the body portion in the radial direction, the plurality of prepregs layered and that extends along an extension direction of the base portion; and
   an attachment plate portion provided on at least one section in an extension direction of the flange,
   the attachment plate portion including an attachment plate portion prepreg that includes the plurality of prepregs projecting outward from the flange in the radial direction of the body portion while extending along the extension direction of the base portion, a metal plate housed in a housing space inside the attachment plate portion prepreg, and an attachment hole formed to extend through the attachment plate portion prepreg and the metal plate in a direction parallel to an axial direction of the body portion,
   the metal plate having a length along a circumferential direction of the body portion and a thickness along the direction parallel to the axial direction of the body portion,
   the attachment hole being formed in an intermediate portion of the metal plate in a longitudinal direction,
   a thickness of the intermediate portion of the metal plate in the longitudinal direction having a dimension larger than a dimension of a thickness of each of both side portions of the metal plate in the longitudinal direction, and
   a number of prepregs located on both side portions of the metal plate in the longitudinal direction and outward of both surfaces of the metal plate in a thickness direction being larger than a number of prepregs located in the intermediate portion of the metal plate in the longitudinal direction and outward of both surfaces of the metal plate in the thickness direction.

2. The aircraft water tank according to claim 1, wherein the metal plate includes a thick wall portion forming an intermediate portion of the metal plate in the longitudinal direction, and a thin wall portion forming both side portions of the metal plate in the longitudinal direction and having a smaller thickness than a thickness of the thick wall portion.

3. The aircraft water tank according to claim 2, wherein the thin wall portion projects from a center of the thick wall portion in the thickness direction along the extension direction of the base portion.

4. The aircraft water tank according to claim 2, wherein one surface of both surfaces of the thick wall portion in the thickness direction and one surface of both surfaces of the thin wall portion in the thickness direction are located flush with each other.

5. The aircraft water tank according to claim 2, wherein the metal plate includes two division metal plates that are located opposite to each other and at a distance from each other in the direction parallel to the axial direction of the body portion, and that extend in the circumferential direction of the body portion, and
   each of the division metal plates includes a thick wall portion forming an intermediate portion of the division metal plate in the longitudinal direction, and a thin wall portion forming both side portions of the division metal plate in the longitudinal direction and having a smaller thickness than the thick wall portion.

6. The aircraft water tank according to claim 2, wherein the thickness of each of the thick wall portion and the thin wall portion is an integral multiple of a thickness of each of the prepregs.

7. The aircraft water tank according to claim 2, wherein the number of prepregs located on both sides of the thick wall portion is equal, and
   the number of prepregs located on both sides of the thin wall portion is equal.

8. The aircraft water tank according to claim 1, wherein the metal plate has a height projecting outward of the body portion in the radial direction,
   a height of a section of the metal plate provided with the attachment hole is formed as a top portion that is higher than any other section of the metal plate, and
   the metal plate on both sides of the top portion in the longitudinal direction of the metal plate is formed with an inclined portion that gradually decreases in height away from the top portion.

9. The aircraft water tank according to claim 1, wherein metal plate includes a thick wall portion forming an intermediate portion of the metal plate in the longitudinal direction, and a thin wall portion forming both side portions of the metal plate in the longitudinal direction and having a thickness gradually decreasing away from the thick wall portion along the longitudinal direction of the metal plate.

10. The aircraft water tank according to claim 1, wherein the base portion has a width in the direction parallel to the axial direction of the body portion, and
    the attachment plate portion prepreg includes prepreg projection portions located on both surfaces of the metal plate in the thickness direction, and a prepreg upper portion connecting, on the metal plate, upper portions of prepreg projections located away from the metal plate and included in the prepreg projection portions located on both surfaces.

11. The aircraft water tank according to claim 1, wherein the plurality of prepregs have an identical thickness.

12. The aircraft water tank according to claim 1, wherein a bush having a length of a dimension identical to a dimension of a thickness of the attachment plate portion is inserted into the attachment hole and fixed.

* * * * *